UNITED STATES PATENT OFFICE.

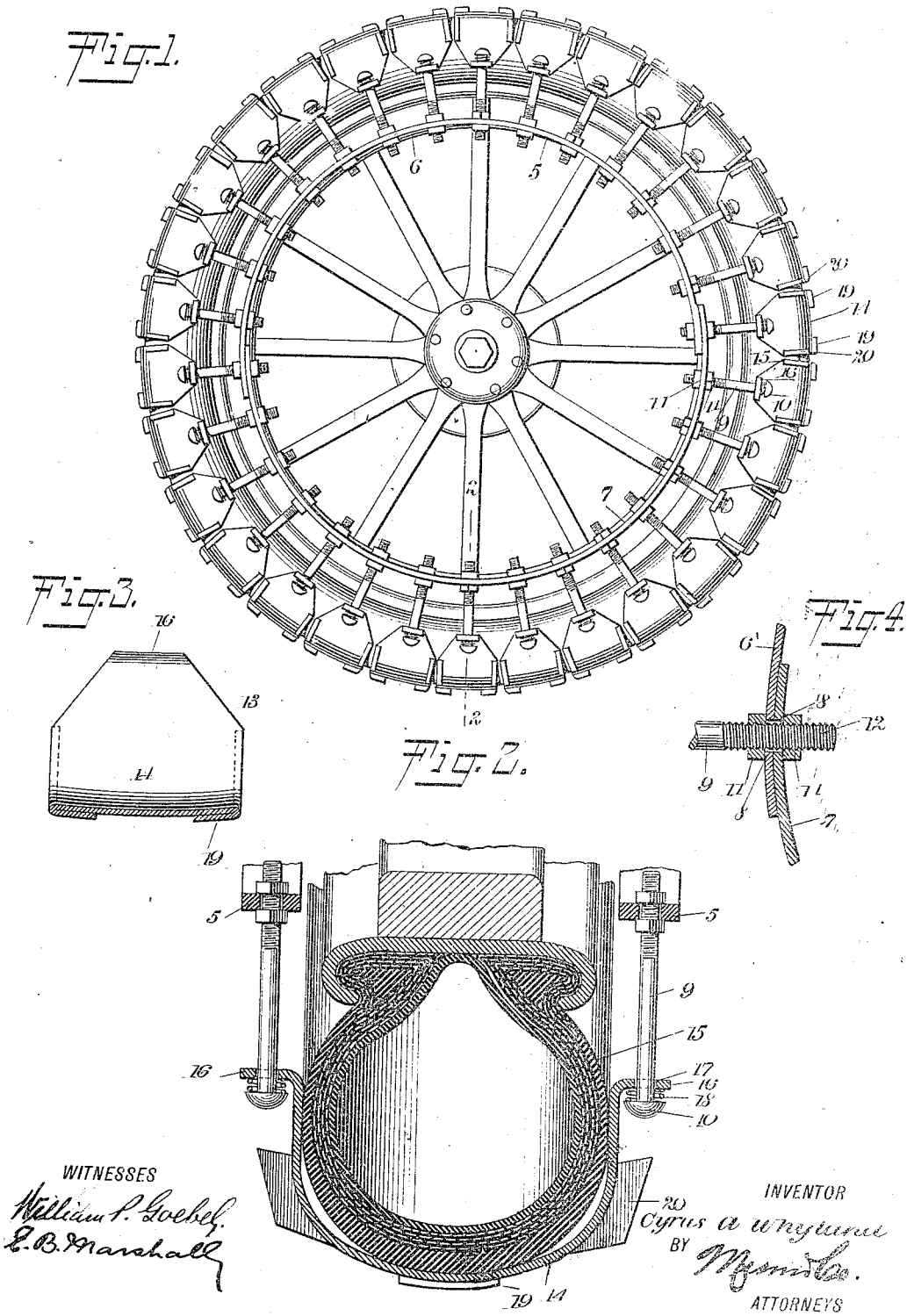

CYRUS A. WHYLAND, OF MARION, MASSACHUSETTS.

SHOE FOR TIRES.

1,012,951.

Specification of Letters Patent. Patented Dec. 26, 1911.

Application filed April 27, 1911. Serial No. 623,629.

*To all whom it may concern:*

Be it known that I, CYRUS A. WHYLAND, a citizen of the United States, and a resident of Marion, in the county of Plymouth and State of Massachusetts, have invented a new and Improved Shoe for Tires, of which the following is a full, clear, and exact description.

My invention relates to shoes for tires, and it has for its object to provide one consisting of a plurality of sections, disposed over the tread of a tire, and held against outward movement from the wheel by members which permit the sections to move inwardly, with the tire.

Additional objects of the invention will appear in the following complete specification, in which the preferred form of my invention is disclosed.

In the drawings similar characters of reference indicate corresponding parts in all the views, in which—

Figure 1 is a side elevation of a wheel, the tire of which is protected by my shoe; Fig. 2 is an enlarged transverse sectional view of Fig. 1; Fig. 3 is a transverse sectional view of one of the shoe members; and Fig. 4 is an enlarged sectional fragmentary view, showing the manner of connecting the members of the circular supports.

By referring to the drawings it will be seen that two circular supports 5 are provided, one being disposed at each side of the wheel, each of these circular supports 5 being composed of two sections 6 and 7, these sections 6 and 7 having each a plurality of orifices 8, which are spaced apart. In the orifices 8 are disposed bolts 9, having heads 10, the bolts being held relatively to the sections 6 and 7 by means of the nuts 11, which engage the thread 12 of the bolts and press against opposite sides of the sections 6 and 7. The ends of the sections 6 and 7 are held relatively to each other by one of the bolts 9, which extends not only through an orifice 8 in the section 6, but also through an orifice 8 in the section 7, so that the nuts 11 will not only hold the bolts 9 in the section 7, but will also hold the sections 6 and 7 relatively to each other.

A plurality of shoes 13 are disposed around the wheel the body portions 14 of the shoes 13 being disposed around the tire 15 of the wheel. Each of the shoes 13 has laterally extending flanges 16, these flanges 16 having orifices 17, through which the bolts 9 are disposed, springs 18 being mounted on the bolts 9, between the flanges 16 and the heads 10. It will be seen that this construction limits the outward movement of the shoes 13 relatively to the wheel, but permits them to move inwardly with the tire 15. The shoes 13 are constructed by bending the body portion 14 so that it will conform with the configuration of the tire, and by bending outwardly the flanges 16. Two parallel cuts are made at the opposite ends of each of the sections 13, the central portions 19 between the cuts being bent over to form flanges on the tread of the shoes, and the portions 20 at the sides of the cut portions being bent laterally to form wings as best shown in Fig. 2 of the drawings.

It will be seen that the shoes may be stamped out at very little expense, and that as the means provided for supporting them on the wheel may be readily and cheaply constructed, the complete device, which will serve to afford the desired protection for the tire, as well as to prevent skidding, may be offered to the public at a relatively very low cost.

Having thus described my invention, I claim as new, and desire to secure by Letters Patent:

An armor member consisting of a bent body portion adapted to be disposed around the tread of a tire, two flanges each having an orifice, extending laterally from the body portion, each end of the body portion being cut in two places to form central flanges bent over the body portion at its center, and wings which are bent laterally.

In testimony whereof I have signed my name to this specification, in the presence of two subscribing witnesses.

CYRUS A. WHYLAND.

Witnesses:
HELEN C. NYE,
WILLIAM A. ANDREW.